United States Patent
Byun et al.

(10) Patent No.: US 10,215,205 B2
(45) Date of Patent: Feb. 26, 2019

(54) ANTI-VIBRATION FASTENING MEMBER AND VEHICLE ACTUATOR FASTENING DEVICE INCLUDING THE SAME

(71) Applicant: Hyundai Motor Company, Seoul (KR)

(72) Inventors: Minhyung Byun, Seoul (KR); Sung Hyung Jo, Hwaseong-si (KR); Yonghyuck Im, Seoul (KR); Soon-Ho Choi, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 176 days.

(21) Appl. No.: 15/341,229

(22) Filed: Nov. 2, 2016

(65) Prior Publication Data

US 2017/0363123 A1 Dec. 21, 2017

(30) Foreign Application Priority Data

Jun. 17, 2016 (KR) ........................ 10-2016-0075395

(51) Int. Cl.
| | |
|---|---|
| *F16B 3/00* | (2006.01) |
| *E05B 77/36* | (2014.01) |
| *E05B 79/02* | (2014.01) |
| *F16F 15/04* | (2006.01) |

(52) U.S. Cl.
CPC ............... *F16B 3/00* (2013.01); *E05B 77/36* (2013.01); *E05B 79/02* (2013.01); *F16F 15/04* (2013.01)

(58) Field of Classification Search
CPC .... Y10T 403/7005; F16B 21/02; E05B 79/02; E05B 77/36; E05B 77/38; F16F 15/02; F16F 15/04
See application file for complete search history.

(56) References Cited

U.S. PATENT DOCUMENTS

| | | | | |
|---|---|---|---|---|
| 3,029,486 A | * | 4/1962 | Raymond | F16B 21/02 174/138 D |
| 3,123,389 A | * | 3/1964 | Biesecker | F16B 5/10 292/218 |
| 3,534,936 A | * | 10/1970 | Knowlton | F16B 21/02 248/653 |
| 3,816,882 A | * | 6/1974 | Maeda | B65D 55/10 411/549 |
| 4,741,224 A | * | 5/1988 | Arata | F16F 15/3153 403/1 |
| 4,770,586 A | * | 9/1988 | Osterland | F16B 21/02 16/86 A |
| 5,897,278 A | * | 4/1999 | Frattarola | F16B 21/02 411/350 |

(Continued)

FOREIGN PATENT DOCUMENTS

| | | |
|---|---|---|
| JP | 5-12222 U | 2/1993 |
| JP | H10-272926 A | 10/1998 |

(Continued)

*Primary Examiner* — Jonathan P Masinick
(74) *Attorney, Agent, or Firm* — Morgan, Lewis & Bockius LLP (57) ABSTRACT

An anti-vibration fastening member may include a first fastening portion formed of an elastic material and comprising a shaft coupled to a shaft coupling hole provided at an actuator, and a second fastening portion integrated with the first fastening portion and comprising holding protrusions introduced into a mounting groove provided at a counterpart on which the actuator is mounted and then held by rotation.

10 Claims, 6 Drawing Sheets

(56) References Cited

U.S. PATENT DOCUMENTS

| | | | | |
|---|---|---|---|---|
| 6,237,970 | B1* | 5/2001 | Joannou | E05B 65/006 |
| | | | | 292/241 |
| 6,254,303 | B1* | 7/2001 | Falat | B23B 31/113 |
| | | | | 403/321 |
| 6,267,543 | B1* | 7/2001 | David | F16B 21/02 |
| | | | | 411/549 |
| 6,923,407 | B2* | 8/2005 | Takeuchi | F16B 21/02 |
| | | | | 24/458 |
| 7,987,816 | B1* | 8/2011 | Walsh | A01K 5/0114 |
| | | | | 119/61.5 |
| 9,982,699 | B2* | 5/2018 | Risdale | F16B 19/002 |

FOREIGN PATENT DOCUMENTS

| | | |
|---|---|---|
| JP | 2976446 B2 | 9/1999 |
| JP | 2009-115148 A | 5/2009 |
| JP | 2011-20504 A | 2/2011 |
| JP | 2014-186403 A | 10/2014 |
| KR | 20-1992-0021269 U | 12/1992 |
| KR | 10-2015-0005669 A | 1/2015 |

* cited by examiner

ANTI-VIBRATION FASTENING MEMBER AND VEHICLE ACTUATOR FASTENING DEVICE INCLUDING THE SAME

CROSS-REFERENCE TO RELATED APPLICATION(S)

The present application claims priority to Korean Patent Application No. 10-2016-0075395, filed Jun. 17, 2016, the entire contents of which is incorporated herein for all purposes by this reference.

BACKGROUND OF THE INVENTION

Field of the Invention

Various embodiments of the present invention relate to anti-vibration fastening members configured to stably fasten an actuator while reducing transmission of vibration of the actuator and vehicle actuator fastening devices including the same.

Description of Related Art

Vehicles are equipped with various types of electric actuators. The electric actuators are mounted on various portions of vehicles to automatically perform operation of locking and unlocking a door or a trunk, operation of opening and closing a sunroof, operation of lifting and lowering a window glass, and the like.

For example, a power latch system installed at a door of a vehicle locks the door after completely closing the door when the door is not completely closed. The power latch system includes an actuator provided with a motor and a latch connected to the actuator via a cable and configured to lock and unlock the door in accordance with operation of the actuator. The actuator is fixed to a panel of a door module by fastening a plurality of bolts thereto.

However, since vibration of an actuator mounted on the panel by using the bolts is transmitted to the panel of the door module, noise may be caused by vibration of the door module.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an anti-vibration fastening member configured to stably fasten an actuator while reducing transmission of vibration of the actuator and a vehicle actuator fastening device including the same.

According to various aspects of the present invention, an anti-vibration fastening member may include a first fastening portion formed of an elastic material and comprising a shaft coupled to a shaft coupling hole disposed at an actuator, and a second fastening portion integrated with the first fastening portion and comprising holding protrusions introduced into a mounting groove disposed at a counterpart on which the actuator is mounted and then held by rotation.

The first fastening portion may include an entry guiding surface formed at a tip of the shaft and having a cone shape, and a dislocation prevention protrusion formed at a circumferential area of the shaft with a greater diameter than an outer diameter of the shaft and held after passing through the shaft coupling hole.

The first fastening portion may further include a spiral protrusion formed on an outer surface of the shaft to be fastened to a spiral groove formed on an inner surface of the shaft coupling hole.

The second fastening portion may include a support protrusion configured to cover the mounting groove and held by one surface of the counterpart, and a central support portion configured to pass through the mounting groove and protrude to an opposite side of the counterpart, and the holding protrusions may radially extend from the central support portion and be held by an opposite surface of the counterpart by rotation.

At least one of the support protrusion and the holding protrusion may include a rotation limiter having a groove or protrusion shape held by the counterpart to limit rotation after a coupling process is completed.

A vehicle actuator fastening device may include a first coupling portion disposed at an actuator and having a shaft coupling hole, a second coupling portion disposed at a counterpart on which the actuator is mounted and having a mounting groove with an opening, and an anti-vibration fastening member configured to mediate coupling between the first coupling portion and the second coupling portion and formed of an elastic material, in which the anti-vibration fastening member may include a first fastening portion including a shaft coupled to a shaft coupling hole of the first coupling portion, and a second fastening portion integrated with the first fastening portion and comprising holding protrusions introduced into the mounting groove of the second coupling portion and then held by rotation.

The first fastening portion may include an entry guiding surface formed at a tip of the shaft and having a cone shape, and a dislocation prevention protrusion formed at a circumferential area of the shaft with a greater diameter than an outer diameter of the shaft and held after passing through the shaft coupling hole.

The first fastening portion may further include a spiral protrusion formed on an outer surface of the shaft, and the first coupling portion may further include a spiral groove formed on an inner surface of the shaft coupling hole to which the spiral protrusion is coupled by rotation.

The mounting groove may include a central groove portion having a circular shape and extending groove portions extending radially outward from both sides of the central groove portion for entry of the holding protrusions, the second fastening portion comprises a support protrusion having a diameter greater than that of the central groove portion to be held by one surface of the counterpart, and a central support portion passing through the central groove portion and protruding to an opposite side of the counterpart, and the holding protrusions may radially extend from the central support portion at positions corresponding to the extending groove portions and held by an opposite surface of the counterpart by rotation.

The extending groove portions may extend in sector form at the circumference of the central groove portion, and the holding protrusions may have shapes corresponding to shapes of the extending groove portions.

Rotation limiters with uneven surfaces may be provided on a first surface of each of the support protrusion and the counterpart and engaged with each other to limit rotation of the anti-vibration fastening member after fastening the anti-vibration fastening member.

Rotation limiters with uneven surfaces may be provided on a second surface of each of the holding protrusion and the counterpart and engaged with each other to limit rotation of the anti-vibration fastening member after fastening the anti-vibration fastening member.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
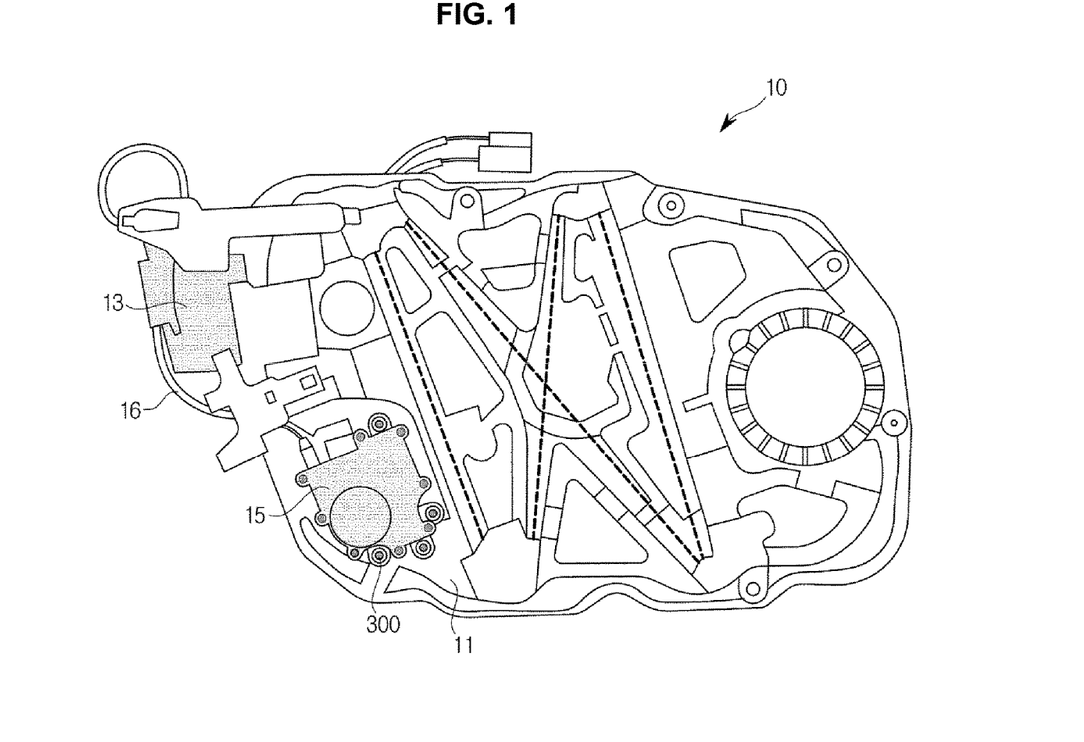
FIG. 1 is a view illustrating a power latch system installed at a door module of a vehicle.

FIG. 1 is a view illustrating a power latch system installed at a door module of a vehicle. The power latch system includes a latch 13 mounted on one side of a panel 11 of a door module 10 and configured to lock and unlock a door and an actuator 15 mounted on the panel 11 of the door module 10 for operation of the latch 13 and connected to the latch 13 via a cable 16. When the door is not completely closed, the actuator 15 may operate the latch 13 such that the door is completely closed and then locked, automatically.

By mounting the actuator 15 on the panel 11 of the door module 10 using a plurality of anti-vibration fastening devices, transmission of vibration generated during operation of the actuator 15 to the door module 10 may be minimized.

Figure 2:
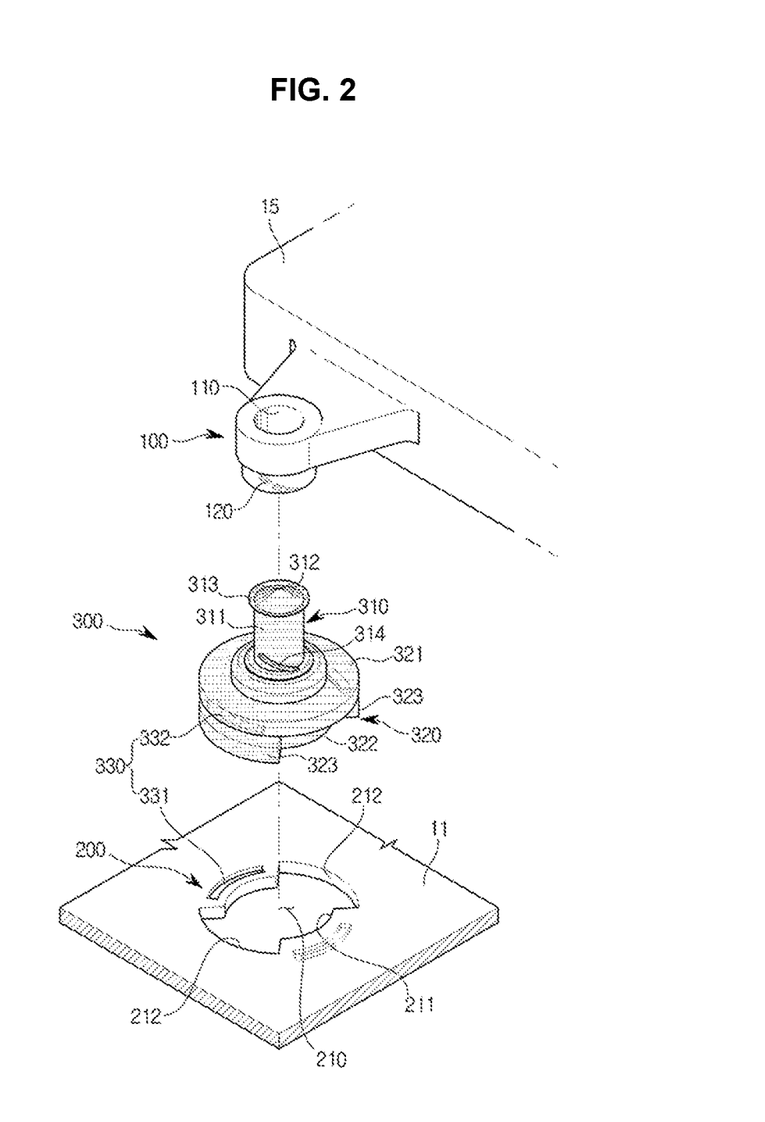
FIG. 2 is a perspective view illustrating an actuator fastening device according to various embodiments of the present invention.
Figure 3:
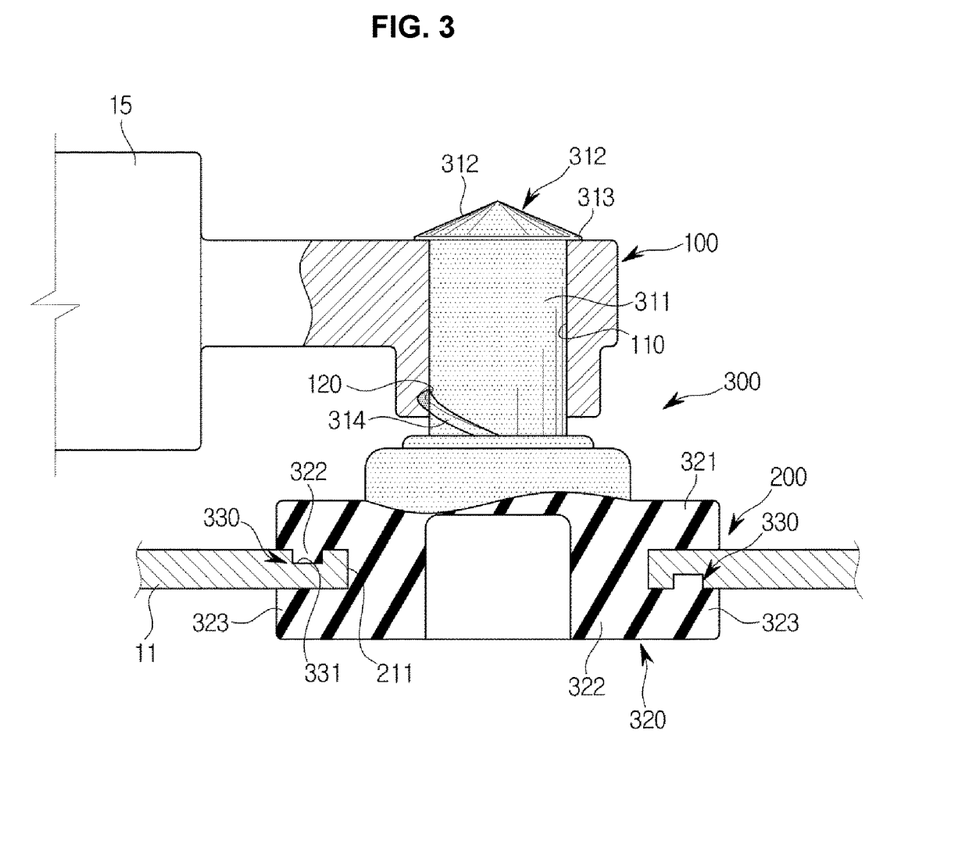
FIG. 3 is a cross-sectional view illustrating an assembled state of the actuator fastening device according to various embodiments of the present invention.

FIG. 2 is a perspective view illustrating an actuator fastening device according to various embodiments. FIG. 3 is a cross-sectional view illustrating an assembled state of the actuator fastening device.

Referring to FIGS. 2 and 3, the actuator fastening device includes a first coupling portion 100 disposed at one side of the actuator 15 and having a shaft coupling hole 110 and a second coupling portion 200 disposed at the panel 11 (counterpart) of the door module on which the actuator 15 is mounted and having a mounting groove 210 with an opening, and an anti-vibration fastening member 300 formed off an elastic material and configured to mediate coupling between the first coupling portion 100 and the second coupling portion 200.

The anti-vibration fastening member 300 includes a first fastening portion 310 coupled to the shaft coupling hole 110 of the first coupling portion 100 and a second fastening portion 320 integrated with the first fastening portion 310 and coupled to the mounting groove 210 of the second coupling portion 200. The first fastening portion 310 includes a shaft 311 configured to enter the shaft coupling hole 110 of the first coupling portion 100 and coupled thereto, an entry guiding surface 312 formed at a tip portion of the shaft 311 and having a cone shape, and a dislocation prevention protrusion 313 formed at a circumferential area of the shaft 311 with a greater diameter than an outer diameter of the shaft 311 and held after passing through the shaft coupling hole 110.

Since the entry guiding surface 312 has a cone shape, the shaft 311 may be easily introduced into the shaft coupling hole 110. Although the dislocation prevention protrusion 313 is greater than an inner diameter of the shaft coupling hole 110, the dislocation prevention protrusion 313 is elastically deformable so as to easily pass through the shaft coupling hole 110 during coupling of the shaft 311. Since the dislocation prevention protrusion 313 is held by an upper surface of the first coupling portion 100 after passing through the shaft coupling hole 110 as illustrated in FIG. 3, decoupling of the shaft 311 in a reverse direction may be prevented after being coupled to the shaft coupling hole 110.

As illustrated in FIG. 2, the first fastening portion 310 of the anti-vibration fastening member 300 may have a spiral protrusion 314 formed on an outer surface of the shaft 311, and the first coupling portion 100 of the actuator 15 coupled to the first fastening portion 310 may have a spiral groove 120 formed on an inner surface of the shaft coupling hole 110 to which the spiral protrusion 314 is fastened by rotation. Thus, by rotating the anti-vibration fastening member 300 by a predetermined angle in a state where the first fastening portion 310 is coupled to the shaft coupling hole 110 of the first coupling portion 100, the spiral protrusion 314 is fastened to the spiral groove 120 so as to be firmly coupled thereto. That is, the first fastening portion 310 is not separated from the first coupling portion 100 by preventing the first fastening portion 310 from reversely rotating.

Figure 4:
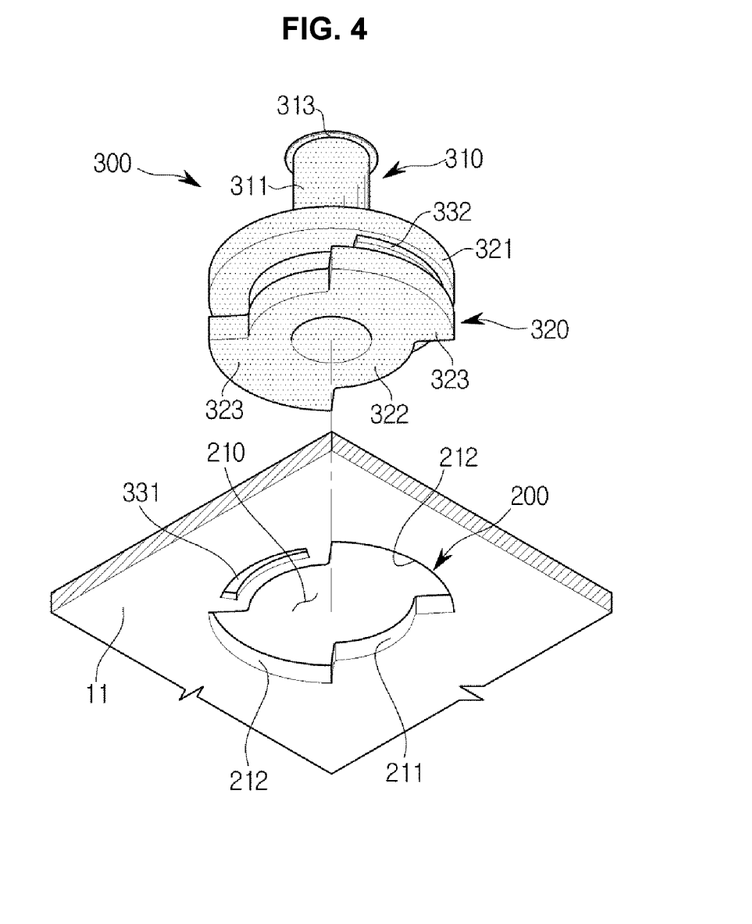
FIG. 4 is a perspective view illustrating an anti-vibration fastening member of the actuator fastening device and a mounting groove formed in the panel of the door module according to various embodiments of the present invention.

The mounting groove 210 of the second coupling portion 200 has a central groove portion 211 having a circular shape and extending groove portions 212 extending radially outward from both sides of the central groove portion as illustrated in FIGS. 2 and 4. The extending groove portions 212 have sector form at both sides of the circumference of the central groove portion 211 to extend the mounting groove 210 outward from both of the sides.

The second fastening portion 320 of the anti-vibration fastening member 300 includes a support protrusion 321, a central support portion 322, and two holding protrusions 323.

The support protrusion 321 has a diameter greater than that of the central groove portion 211 to be held by one surface of the panel 11 provided with the mounting groove 210. The central support portion 322 is formed to correspond to an inner diameter of the central groove portion 211 to enter the central groove portion 211 of the mounting groove 210 for coupling. After passing through the central groove portion 211, the central support portion 322 protrudes to the opposite side of the panel 11.

Figure 5A:
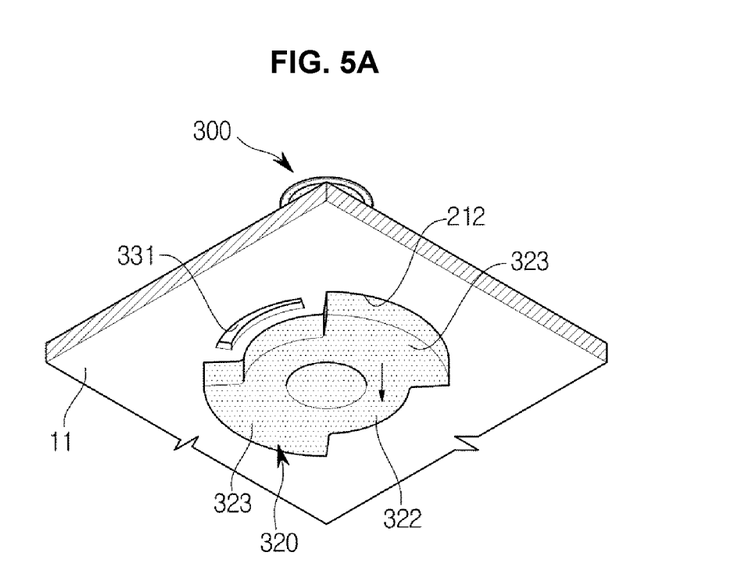
FIG. 5A and FIG. 5B are perspective views illustrating examples in which the anti-vibration fastening member is coupled to the mounting groove according to various embodiments of the present invention.
Figure 5B:
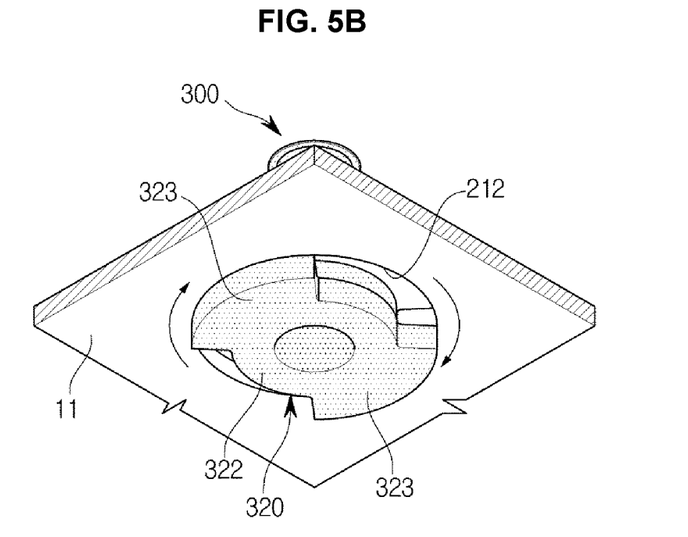

The two holding protrusions 323 may have wing shapes corresponding to the shapes of the extending groove portions 212 and respectively extend radially outward from the central support portion 322 at positions corresponding to the extending groove portions 212. The two holding protrusions 323 may pass through the extending groove portions 212 to protrude to the opposite side of the panel 11 as illustrated in FIG. 5A when the second fastening portion 320 of the anti-vibration fastening member 300 is coupled thereto. The two holding protrusions 323 may be held by the opposite surface of the panel by rotation as illustrated in FIG. 5B such that the second fastening portion 320 is held by the second coupling portion 200 of the panel 11.

A rotation limiter 330 with uneven surfaces, which are engaged with each other to limit rotation of the anti-vibration fastening member 300 after fastening, may be provided on one surface of each of the support protrusion 321 and the panel 11. The rotation limiter 330 may include a groove 331 formed on an upper surface of the panel 11 around the central groove portion 211 of the mounting groove 210 and a protrusion 332 formed on a lower surface of the support protrusion 321 to be engaged with the groove 331 in a shape corresponding to the groove 331 as illustrated in FIGS. 2 and 3. In this case, although the protrusion 332 is formed on the support protrusion 321, and the groove 331 is formed on the upper surface of the panel 11, positions of the protrusion 332 and the groove 331 may be reversed. That is, the groove 331 may be formed on the support protrusion 321, and the protrusion 332 may be formed on the upper surface of the panel 11.

The rotation limiter 330 may limit rotation of the anti-vibration fastening member 300 as the protrusion 332 is engaged with the groove 331 when the fastening of the second fastening portion 320 of the anti-vibration fastening member 300 is completed. As a result, a coupled state between the second fastening portion 320 of the anti-vibration fastening member 300 and the panel 11 may be firmly maintained. The rotation limiter 330 may also be provided in the same form on the opposite surfaces of the holding protrusion 323 and the panel 11.

Then, a method of mounting the actuator 15 on the panel 11 of the door module 10 by using the actuator fastening device will be described.

In order to mount the actuator 15, first, the first fastening portion 310 of the anti-vibration fastening member 300 is coupled to the first coupling portion 100 of the actuator 15.

That is, the shaft 311 of the first fastening portion 310 is pressed into the shaft coupling hole 110 of the first coupling portion 100. After this coupling, the dislocation prevention protrusion 313 having passed through the shaft coupling hole 110 is held by the upper surface of the first coupling portion 100, and thus the coupled state may be maintained. In this case, the spiral protrusion 314 of the first fastening portion 310 and the spiral groove 120 of the inner surface of the shaft coupling hole 110 may be maintained in an uncoupled state.

After the first fastening portion 310 of the anti-vibration fastening member 300 is coupled to the first coupling portion 100 of the actuator 15, the second coupling portion 320 of the anti-vibration fastening member 300 is coupled to the second coupling portion 200 of the panel 11 of the door module. Here, the anti-vibration fastening member 300 is adjusted such that positions of the two holding protrusions 323 of the second fastening portion 320 correspond to those of the extending groove portions 212 of the mounting groove 210, and then the central support portion 322 and the two holding protrusion 323 of the second fastening portion 320 are introduced into the mounting groove 210. Then, the two holding protrusions 323 of the second fastening portion 320 pass through the extending groove portions 212 of the mounting groove 210 and protrude to the opposite side of the panel 11 as illustrated in FIG. 5A. Then, by rotating the anti-vibration fastening member 300 as illustrated in FIG. 5B, the two holding protrusions 323 are held by the opposite surface of the panel 11. Simultaneously, the rotation limiters 330 with uneven surfaces are engaged with each other to form a firmer coupling. Since the rotation is limited by the rotation limiter 330 after the coupling, separations is prevented unless an external force is applied thereto.

By rotating the anti-vibration fastening member 300 while coupling the second fastening portion 320 thereto, the spiral protrusion 314 of the first fastening portion 310 is fastened to the spiral groove 120 of the inner surface of the shaft coupling hole 110. Thus, the first coupling portion 100 of the actuator 15 is firmly coupled to the first fastening portion 310 of the anti-vibration fastening member 300, and is not decoupled unless the anti-vibration fastening member 300 is reversely rotated.

After the mounting process is completed, the actuator 15 is coupled to the panel 11 of the door module by the anti-vibration fastening member 300 formed of the elastic material and spaced apart from the panel 11 as illustrated in FIG. 3. Thus, vibration generated during operation of the actuator 15 may not be transmitted to the panel 11 of the door module.

Although the actuator fastening device is applied to the actuator 15 mounted on the panel 11 of the door module according to the various embodiments, applications of the actuator fastening device are not limited thereto. The actuator fastening device may also be applied, in the same manner, to any counterpart on which the actuator is mounted. For example, the actuator fastening device may also be used for an actuator for locking and unlocking a trunk of a vehicle, an actuator for opening and closing a sunroof, an actuator for lifting and lowering a window glass, and the like.

As is apparent from the above description, according to the vehicle actuator fastening device according to various embodiments, the anti-vibration fastening member formed of an elastic material mediates coupling between the actuator and the counterpart and maintains the actuator to be spaced apart from the counterpart. Thus, vibration generated during operation of the actuator may be reduced. That is, transmission of vibration of the actuator may be minimized.

The vehicle actuator fastening device according to various embodiments may stably fasten the actuator since the first fastening portion of the anti-vibration fastening member is coupled to the first coupling portion of the actuator by rotation, the second fastening portion of the anti-vibration fastening member is coupled to the second coupling portion of the counterpart by rotation, and decoupling thereof is prevented by limiting rotation of the anti-vibration fastening member after coupling.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An anti-vibration fastening member comprising:
a first fastening portion formed of an elastic material and comprising a shaft coupled to a shaft coupling hole disposed at an actuator; and
a second fastening portion integrated with the first fastening portion and comprising holding protrusions introduced into a mounting groove disposed at a counterpart on which the actuator is mounted and then held by rotation,
wherein the first fastening portion further comprises a spiral protrusion formed on an outer surface of the shaft to be fastened to a spiral groove firmed on an inner surface of the shaft coupling hole.

2. The anti-vibration fastening member according to claim 1, wherein the first fastening portion comprises:
an entry guiding surface formed at a tip of the shaft and having a cone shape; and
a dislocation prevention protrusion formed at a circumferential area of the shaft with a greater diameter than an outer diameter of the shaft and held after passing through the shaft coupling hole.

3. The anti-vibration fastening member according to claim 1, wherein
the second fastening portion comprises a support protrusion configured to cover the mounting groove and held by one surface of the counterpart, and a central support portion configured to pass through the mounting groove and protrude to an opposite side of the counterpart; and
the holding protrusions radially extend from the central support portion and are held by an opposite surface of the counterpart by rotation.

4. The anti-vibration fastening member according to claim 3, wherein at least one of the support protrusion and the holding protrusion comprises a rotation limiter having a groove or protrusion shape held by the counterpart to limit rotation after a coupling process is completed.

5. A vehicle actuator fastening device comprising:
a first coupling portion disposed at an actuator and having a shaft coupling hole;
a second coupling portion disposed at a counterpart on which the actuator is mounted and having a mounting groove with an opening; and
an anti-vibration fastening member configured to mediate coupling between the first coupling portion and the second coupling portion and formed of an elastic material,
wherein the anti-vibration fastening member comprises:
a first fastening portion comprising a shaft coupled to the shaft coupling hole of the first coupling portion; and
a second fastening portion integrated with the first fastening portion and comprising holding protrusions introduced into the mounting groove of the second coupling portion and then held by rotation,
wherein the first fastening portion comprises an entry guiding surface formed at a tip of the shaft and having a cone shape and a dislocation prevention protrusion formed at a circumferential area of the shaft with a greater diameter than an outer diameter of the shaft and held after passing through the shaft coupling hole.

6. The vehicle actuator fastening device according to claim 5, wherein
the first fastening portion further comprises a spiral protrusion formed on an outer surface of the shaft; and
the first coupling portion further comprises a spiral groove formed on an inner surface of the shaft coupling hole to which the spiral protrusion is coupled by rotation.

7. The vehicle actuator fastening device according to claim 5, wherein
the mounting groove comprises a central groove portion having a circular shape and extending groove portions extending radially outward from both sides of the central groove portion for entry of the holding protrusions;
the second fastening portion comprises a support protrusion having a diameter greater than that of the central groove portion to be held by one surface of the counterpart, and a central support portion passing through the central groove portion and protruding to an opposite side of the counterpart; and
the holding protrusions radially extend from the central support portion at positions corresponding to the extending groove portions and held by an opposite surface of the counterpart by rotation.

8. The vehicle actuator fastening device according to claim 7, wherein
the extending groove portions extend in sector form at the circumference of the central groove portion; and
the holding protrusions have shapes corresponding to shapes of the extending groove portions.

9. The vehicle actuator fastening device according to claim 7, wherein rotation limiters with uneven surfaces are provided on a first surface of each of the support protrusion and the counterpart and engaged with each other to limit rotation of the anti-vibration fastening member after fastening the anti-vibration fastening member.

10. The vehicle actuator fastening device according to claim 7, wherein rotation limiters with uneven surfaces are provided on a second surface of each of the holding protrusion and the counterpart and engaged with each other to limit rotation of the anti-vibration fastening member after fastening the anti-vibration fastening member.

\* \* \* \* \*